May 31, 1938.  R. G. LOCKETT  2,119,337
REVERSING CONTROL APPARATUS FOR A PLURALITY OF ELECTRIC MOTORS
Filed July 24, 1936  3 Sheets-Sheet 2

May 31, 1938.  R. G. LOCKETT  2,119,337
REVERSING CONTROL APPARATUS FOR A PLURALITY OF ELECTRIC MOTORS
Filed July 24, 1936  3 Sheets-Sheet 3

Inventor
Ralph G. Lockett
By Frank H. Hubbard
Attorney

Patented May 31, 1938

2,119,337

UNITED STATES PATENT OFFICE 2,119,337

REVERSING CONTROL APPARATUS FOR A PLURALITY OF ELECTRIC MOTORS

Ralph G. Lockett, Wauwatosa, Wis., assignor to Cutler-Hammer, Inc., Milwaukee, Wis., a corporation of Delaware Application July 24, 1936, Serial No. 92,280

18 Claims. (Cl. 172—240)

This invention relates to improvements in reversing control apparatus for a plurality of electric motors. Although not limited to such use, the invention is particularly adapted for timing reversals of a plurality of motors driving commercial laundry type washing machines or the like.

An object of the invention is to provide control apparatus of the aforementioned character which is extremely simple in construction and trustworthy in operation.

Another object is to provide control apparatus comprising substantially identical control units for the respective driving motors, with simple means for insuring or affording operation of such units in a manner to effect reversals of said motors in a predetermined sequence relatively to each other.

Another object is to provide simple means for effecting adjustment of the aforementioned control units individually, whereby the relationship or sequence of operation thereof with respect to each other may be varied at will in accordance with the number of driving motors employed or to be rendered active in a given group or installation.

Another and more specific object is to provide a simple form of indicating means for facilitating adjustment at will of the control units relatively to each other according to whether all or less than all of the driving motors of a group are to be rendered active.

Another object is to provide apparatus enabling reversing control of a relatively large number of driving motors (say, eight) in a manner to insure against substantial overlapping of the current inrushes incident to reversal of the respective motors.

Another object is to provide means for insuring operation of the several control units at like speeds after the same have been adjusted relatively to each other.

Other objects and advantages of the invention will hereinafter appear.

The accompanying drawings illustrate certain embodiments of the invention which will now be described,—it being understood that the embodiments illustrated are susceptible of modification in respect of certain details of construction thereof without departing from the scope of the appended claims.

Figure 1:
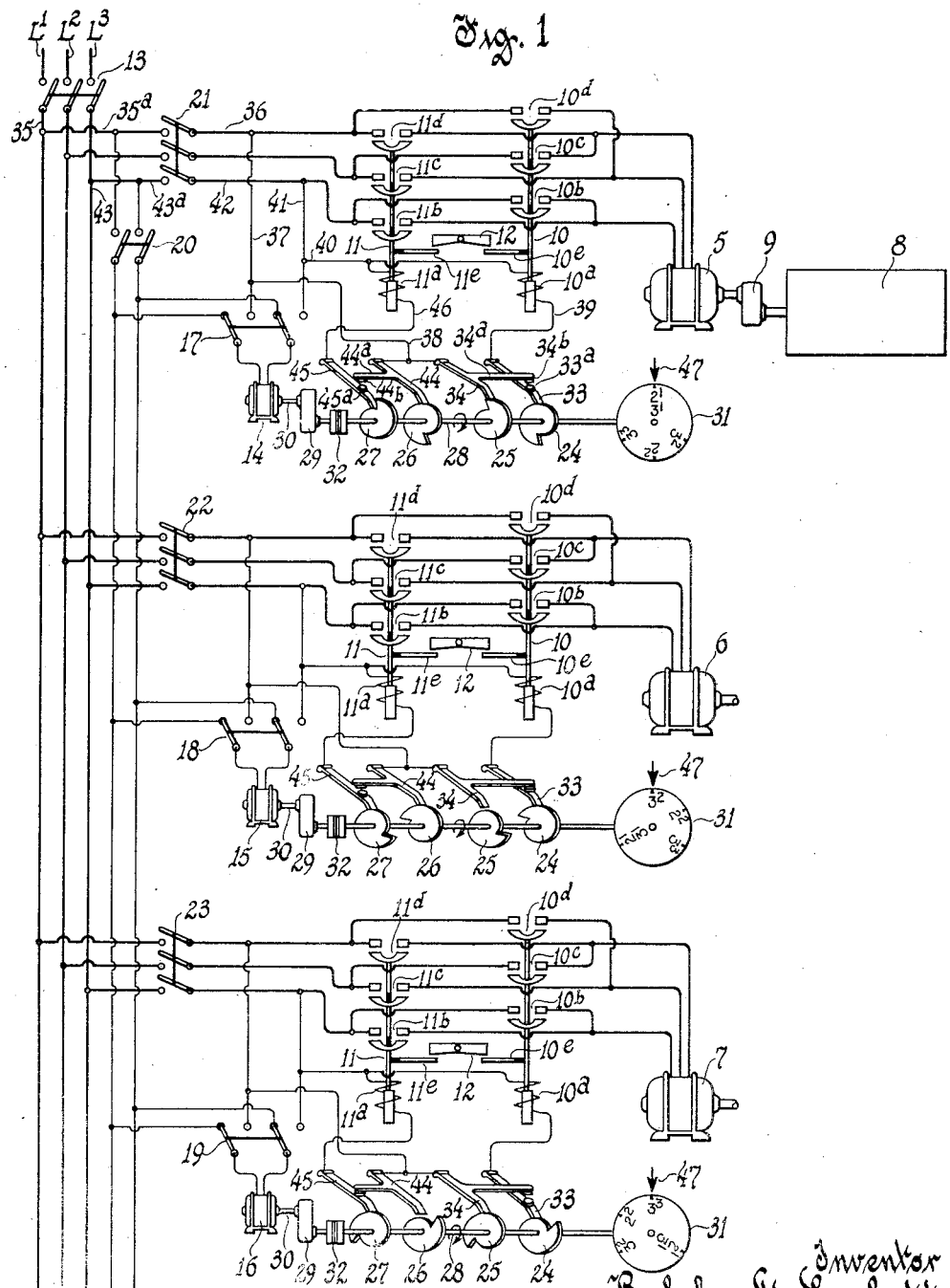

In the drawings, Figure 1 is a schematic and diagrammatic illustration of one form of my improved reversing control apparatus as applied to a group of three motors driving washing machines or the like,—it being understood that as many as eight driving motors may be, and usually are, embodied in a single group,—to provide for reversing thereof in a predetermined or desired sequence to minimize the consumption of current at any given instant of time.

Figure 2:
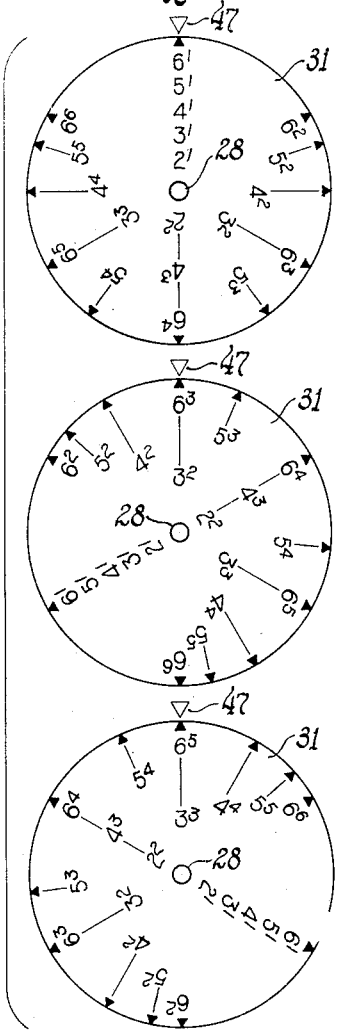
Figure 3:
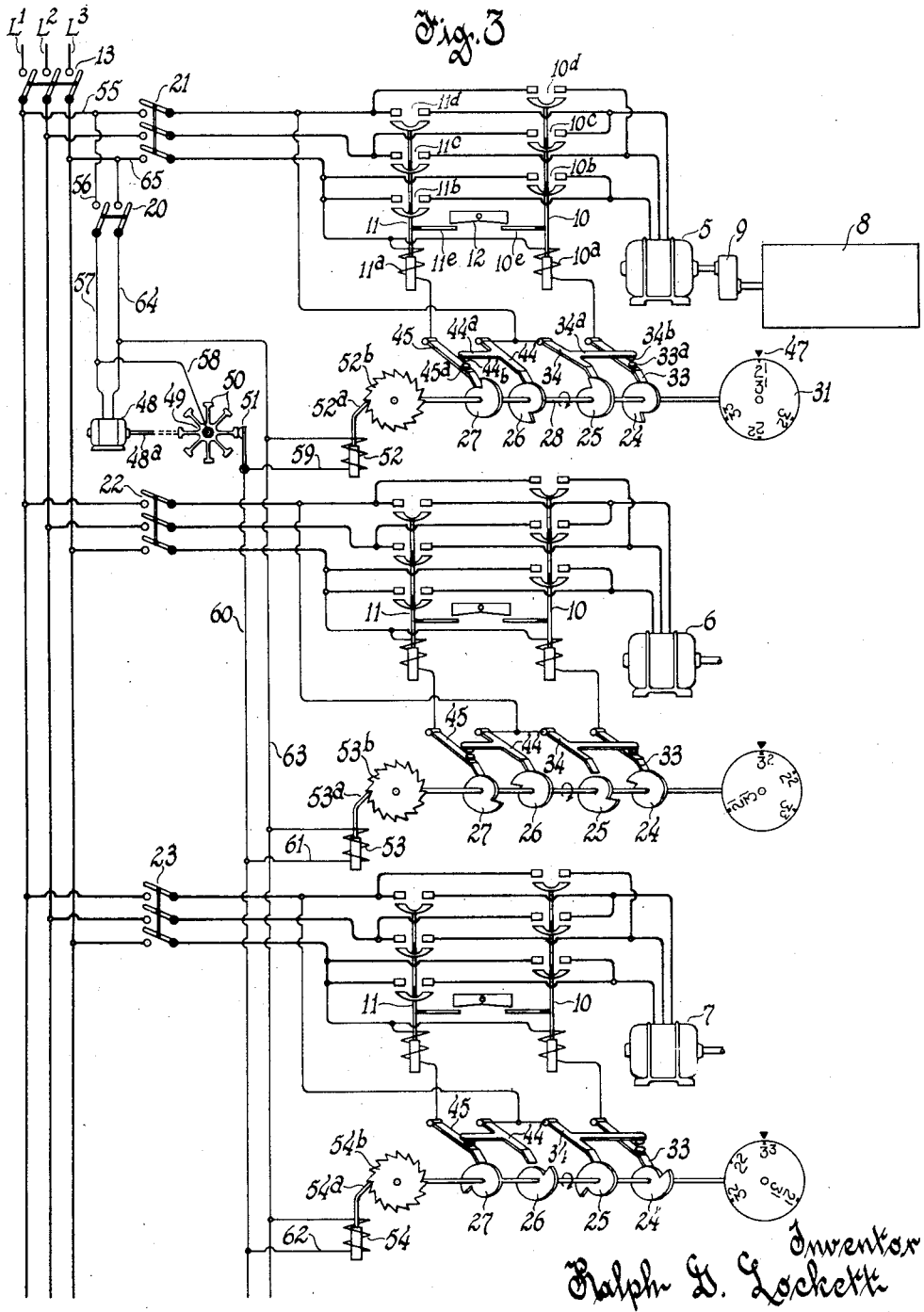

Fig. 2 is a detail plan view of the three indicating dials shown in Fig. 1, showing the angular arrangement or adjustment thereof to provide proper reversing control for a group of three driving motors; and Fig. 3 is a view similar to Fig. 1 of a modified form of the invention which is less expensive than the apparatus of Fig. 1 in respect of initial cost while providing for attainment of substantially similar control functions,—it being understood that apparatus of the character illustrated in Fig. 3 is applicable to the control of a group of driving motors from two up to eight in number, with the customary maximum forward and reverse operating periods of the driven devices.

It may be pointed out that in the commercial washer industry, it has been customary to group the driving motors of not more than eight washers,—this value or limitation being set by the accelerating and plugging time of the several motors. That is to say, with the usual periods for forward and reverse operation of the respective motors, if more than eight washer-driving motors are controlled in a group, the high current part of the cycle on the first motor will overlap the high current part of the cycle on the last one.

Referring first to Fig. 1, the numerals 5, 6 and 7 designate reversible electric motors each of which is adapted to drive a machine, such as the cylinder of a washer, as represented by the numeral 8,—suitable speed reducing gearing being interposed between each driving motor and its associated cylinder, as shown at 9. Said motors are supplied with alternating current from a suitable source, as represented by lines $L^1$, $L^2$, $L^3$. It will be apparent to those skilled in the art that each motor may drive a load other than the washer cylinder 8, as, for instance, a rotatable clothes drying tumbler, or any similar device which it is desired to drive alternately in opposite directions for like or substantially similar periods of time.

In practice the driving motor and its control means are mounted as a unit upon the device, such as a washing machine, having a part to be driven alternately in reverse directions,—the number of units employed corresponding with the number of machines in the group. The control means for motor 5, for instance, comprises a pair of normally open electromagnetically operable reversing switches 10 and 11, the operating windings of which are shown at 10ª, 11ª, respectively; and the normally open contacts of which are shown at 10ᵇ, 10ᶜ, 10ᵈ and 11ᵇ, 11ᶜ, 11ᵈ, respectively. Switches 10 and 11 are preferably provided with a suitable form of mechanical interlock to insure against closure thereof simultaneously. Said means is shown somewhat diagrammatically as comprising projections 10ᵉ and 11ᵉ upon switches 10 and 11, respectively, and a pivoted member 12 the oppositely extending arms of which overlap the projections 10ᵉ and 11ᵉ,—whereby upon closing movement of either of said switches the other will be restrained against movement to closed position.

I prefer to provide a main switch 13 which is adapted when opened to disconnect the entire system from lines $L^1$, $L^2$ and $L^3$. The reversing control units for the motors 5, 6, 7, respectively, comprise single-phase synchronous type pilot motors designated by the numerals 14, 15, 16. Said pilot motors are respectively provided with individual manually operable control switches 17, 18, 19 of the double-pole type, said switches when in the left-hand extreme positions thereof illustrated being adapted to subject said pilot motors to joint control by a single manually operable switch 20. Switches 17, 18 and 19 may be moved to the right-hand extreme positions thereof to subject the respective pilot motors to control by the manually operable switches 21, 22 and 23 which are individual to the respective control units. Switches 17, 18 and 19 may also be moved to an intermediate off position whereby the circuits of the respective pilot motors are interrupted regardless of the positions of the other control switches.

In practice, if the switch 17 is moved to its intermediate off position when the cams driven by motor 14 are in the positions thereof illustrated, the switches controlled by said cams will remain in the open positions thereof illustrated, and the control unit for motor 5 will be disabled notwithstanding closure of the switches 13 and 21 aforementioned. On the other hand, if switch 17 is moved to its intermediate off position when the cams driven by motor 14 are in positions corresponding to the illustrated positions of the cams driven by motor 15, upon closure of switches 13 and 21 the reversing switch 10 will be energized continuously, to provide for continuous unidirectional operation of motor 5 and the cylinder 8 driven thereby. Or, with switch 17 in its intermediate off position, the cams may be positioned as illustrated in the group to be driven by motor 16, whereby motor 5 and cylinder 8 are continuously operated in the reverse direction.

With switches 13 and 20 closed, the cams driven by the respective pilot motors 14, 15, 16, etc., may be adjusted to the desired positions thereof by individually and temporarily moving the switches 17, 18, 19 to the left-hand positions illustrated; or said groups of cams may be manually adjusted independently of the respective pilot motors, as by means of the knobs hereinafter described. By providing for intermediate off positioning of switches 17, 18, etc., the flexibility of the system as a whole is increased, as will be obvious.

The cams to be driven (in the direction indicated by the arrow) by motor 14 are designated by the numerals 24, 25, 26 and 27,—the same being keyed or otherwise rigidly attached to a common shaft 28 which is connected through suitable speed-reducing gearing 29 to the armature shaft 30 of said motor. Shaft 28 is provided at the right-hand end thereof with a disk or knob 31 to provide for manual adjustment of said cams; a slip-clutch 32 being interposed between gearing 29 and that portion of shaft 28 which carries said cams. The cams are arranged in pairs, 24, 25 and 26, 27;—the pair of cams 24 and 25 respectively cooperating with a pair of resilient arms 33 and 34, which are biased, by the inherent resiliency thereof or in any other suitable manner, into engagement with said cams. Arm 33 is preferably provided with a boss or tip 33ª of suitable wear-resisting and arc-resisting metal, such as silver; the arm 34 having a lateral projection 34ª which overlies the arm 33, and is provided with a silver boss or tip 34ᵇ for cooperation with the tip 33ª.

In general, there will be no objection if all of the pilot motors in a group run when it is necessary to run one or more washers of a group. This follows from the fact that the pilot motors require practically no attention, and consume very little power. I therefore prefer to normally maintain the switches 17, 18, etc., in the left-hand positions thereof shown in Fig. 1, whereby all of the pilot motors in a group of washing machines will be driven from a pair of bus wires energized from one source, through a single control device, as represented by the switch 20.

Thus as shown in the upper control unit of Fig. 1, and assuming closure of switches 13, 20 and 21, upon a slight degree of additional rotary movement of shaft 28, the arm 34 will drop from the high portion of cam 25 toward the low portion thereof; but during such movement the tip 34ᵇ will engage tip 33ª, thus completing an energizing circuit for the winding 10ª of switch 10, which may be traced from line $L^1$ through switch 13, conductors 35 and 35ª through switch 21, conductors 36, 37 and 38 through arm 34, projection 34ª to arm 33, conductor 39 through said winding 10ª, conductors 40, 41 and 42 through switch 21, and by conductors 43ª and 43 through switch 13 to line $L^3$. Inasmuch as the switch 11 is then in open position, the switch 10 may be closed through the action of its winding 10ª to complete a circuit for motor 5 to provide for operation thereof in one direction. Such circuit for motor 5 is believed to be obvious, and will not be traced, except to point out that line $L^1$ is connected through contacts 10ᵈ with the middle terminal of said motor; line $L^2$ is connected through contacts 10ᶜ with the right-hand terminal of said motor; and line $L^3$ is connected through contacts 10ᵇ with the left-hand terminal of said motor.

Upon closure of switch 10 the projection 10ᵉ carried thereby engages member 12 to move the same upon its pivot into restraining relation to projection 11ᵉ carried by switch 11, whereby closing movement of the latter is prevented pending deenergization of winding 10ª and opening of switch 10. With switch 10 thus closed, it will be noted that upon continued rotation of shaft 28 the cam 24 will act to maintain the contact tips 33ª, 34ᵇ in engagement throughout a rotary angle of approximately 180 degrees. At this point the arm 33 will drop from the high portion of cam 24 onto the low portion thereof, and arm 34 will drop into engagement with cam 25 at a point substantially midway between the high and low portions thereof. Inasmuch as the arm 33 falls a considerably greater distance than arm 34,—it follows that contact tips 33ª, 34ᵇ will be disengaged to interrupt the energizing circuit of winding 10ᵃ.

The cams 26, 27 cooperate respectively with arms 44 and 45,—said arm 44 having a projection 44ᵃ provided with a silver contact tip or boss 44ᵇ which overlies the silver contact tip or boss 45ᵃ carried by arm 45. The arrangement is preferably such that very shortly after interruption of the energizing circuit of winding 10ᵃ in the manner aforedescribed, the arm 44 will drop from the high portion of cam 26 toward the low portion thereof. However, the arm 45 will then be engaged by cam 27 at a point midway between the high and low portions of the latter; wherefore the contact tip 44ᵇ will engage contact tip 45ᵃ to complete an energizing circuit for the winding 11ᵃ of switch 11. Said circuit may be traced from line L¹ by conductors 35, 35ᵃ through switch 21, conductors 36, 37 and 38, through arm 44, projection 44ᵃ, arm 45, conductor 46, said winding 11ᵃ, conductors 40, 41, 42 through switch 21, and by conductors 43ᵃ, 43 through switch 13 to line L³.

Switch 11 is thus closed; the projection 11ᵉ carried thereby cooperating with member 12 to restrain switch 10 against closing pending deenergization of winding 11ᵃ. The reverse circuit provided for motor 5 is believed to be obvious; but it may be pointed out that line L¹ is connected through contacts 11ᵈ to the right-hand terminal of said motor; line L² is connected through contacts 11ᶜ to the middle terminal of said motor; and line L³ is connected through contacts 11ᵇ to the left-hand terminal of said motor. Under the conditions aforedescribed the winding 11ᵃ will remain energized for a period corresponding substantially to 180 degrees of rotation of shaft 28; or, in other words, until the arm 45 drops from the high portion of cam 27 to the low portion thereof,—the arm 44 being then engaged with cam 26 at a point midway between the high and low portions of the latter; whereby the contact tips 44ᵇ, 45ᵃ are disengaged, as shown in the upper unit of Fig. 1.

The aforementioned disk or knob 31 rigidly attached to the right-hand end of shaft 28 provides for manual adjustment of the rotary position of said shaft (that is, the angular position of the cam members 24 to 27 jointly); such adjustment being effected by rotation of shaft 28 in the aforementioned direction indicated by the arrow; and the slip clutch 32 provides for such rotation independently of gearing 29 and the armature shaft of motor 14. It may be assumed that the three motors 5, 6 and 7 in Fig. 1 are to be rendered active.

Accordingly the disk 31 is moved to a position wherein the legend "3¹" registers with the arrow 47, which is supported in a fixed position by any suitable means (not shown). The disk 31 associated with the control unit for motor 6 is moved to a position wherein the legend "3²" thereon registers with the arrow 47; and the disk 31 associated with the control unit for motor 7 is moved to a position wherein the legend "3³" thereon registers with its associated arrow 47. As will be apparent, the purpose is to provide a predetermined degree of rotary angular displacement (120 degrees) of the three groups of cams 24 to 27 with respect to each other. Accordingly any one of the three disks 31 may be set to register the legend "3¹", provided that the other two disks are respectively set at "3²" and "3³". The desirable flexibility of this indicating means will be appreciated when it is considered that the complete control system will normally comprise as many as eight driving motors like the motors 5, 6 and 7.

Also as will be apparent from Fig. 1, if only two of the three motors 5, 6 and 7 are to be rendered active, the disk 31 associated with the control unit of one of the two motors is adjusted so that the legend "2¹" registers with its associated arrow 47, and the other disk 31 is adjusted so that the legend "2²" thus registers. As aforeindicated, the control units for motors 6 and 7 are identical with the aforedescribed control unit for motor 5,—and aside from the distinguishing numerals heretofore mentioned, the parts for the three control units are given like numerals of reference.

In Fig. 2 I have shown in greater detail the arrangement of the indicating legends upon the respective disks 31, where the latter are employed with a system of control for six driving motors,—it being understood that six of such identical disks would be provided, and that the several legends upon the disks will be arranged in like angular relationship to the sets of cam members 24 to 27 with which they are associated. If six motors are to be rendered active, for instance, one disk 31 will have its legend "6¹" moved to register with its arrow 47; another disk will have legend "6²" so registered; another "6³" so registered, and so on, to provide for a rotary or angular displacement of 60 degrees of the six sets of cam members 24 to 27 with respect to each other. Where eight motors are to be rendered active, the disks will bear the legends "8¹", "8²", etc., so that the various sets of cam members may be angularly displaced 45 degrees with respect to each other.

By the use of synchronous type motors, such as 14, 15, etc., maintenance of a given angular setting of the sets of cam members relatively to each other is insured. Thus in a complete system of the character aforedescribed, after setting of the cam members and closure of switches 13, 20, 21, 22, 23 etc., the motors 5, 6, 7, etc., will be intermittently reversed in a predetermined sequence with respect to each other, whereby the value of the current inrushes incident to reversal of the motors cannot exceed a predetermined maximum. This feature is particularly important in respect of installations where the consumer is obliged to pay for electric current on the basis of peak-load requirements.

In installations where only two or three, or even four driving motors are employed, it may be considered unnecessary to employ the indicating disks 31, since the operator may move and fairly accurately judge the relative angular positions of the cam members of the respective sets (utilizing for this purpose, say, the cam member 24 of each set). Thus, if two motors are to be active, with the cam member 24 of one set in any given position, it is only necessary to provide for approximately 180 degrees angular displacement of the cam 24 of the other set with respect thereto. Similarly, where three motors are to be active, it is only necessary to provide for an angular displacement of 120 degrees of the cam members 24 with respect to each other, and so on.

The reversing control system illustrated in Fig. 3 is functionally equivalent to that of Fig. 1, and most of the parts are identical with those aforedescribed and are given like characters of reference. In Fig. 3, however, only one pilot motor 48 is employed. The motor 48, of course, need not be of the synchronous type, but may be of any suitable type; the same being shown as connectable to the alternating current supply lines L¹ and L³ through the medium of switches 13 and 29. As will be apparent, however, the entire system of Fig. 3 might be connected with a direct current source of supply,—only the obvious changes in the parts of the system, such as the substitution of direct current motors for those designated 5, 6 and 7, and modification of switches 10 and 11, being necessary.

Thus, in Fig. 3 the motor 48, through its armature shaft 48ª, rotatably drives a hub 49 carrying a multiplicity of radial contacts 50 (eight being shown) which are engageable in sequence with a resilient or spring-pressed stationary contact 51. A number of solenoid windings 52, 53 and 54,— corresponding to the number of motors to be controlled,—are employed. Assuming closure of switches 13 and 20, the upper terminals of windings 52, 53 and 54 will be continuously connected with the source of current supply, and upon engagement of any one of the contacts 50 with stationary contact 51 a circuit will be completed for connecting said windings in parallel with each other across two lines of the source of current supply. Said circuit may be traced from line L¹ through switch 13, conductors 55 and 56 through switch 20, conductors 57 and 58 through one of the contacts 50 and stationary contact 51, by conductor 59 to the lower terminal of winding 52, and by conductor 60 and conductors 61 and 62, respectively, to the lower terminals of windings 53 and 54; the upper terminals of windings 52, 53 and 54 each being connected with conductor 63,—the circuit extending thence by conductor 64 through switch 20, and by conductor 65 through switch 13 to line L³. Said windings are thus connected in parallel to provide for energization thereof jointly during engagement of the aforementioned contact 50 with contact 51.

The plungers of said solenoids are respectively provided with pawl members 52ª, 53ª and 54ª which cooperate with the respective toothed wheels 52ᵇ, 53ᵇ and 54ᵇ which are rigidly attached to the shafts 28, whereby predetermined like degrees of rotation of said shafts are simultaneously effected,—say, a rotary distance corresponding to one tooth on each wheel. Due to continued unidirectional operation of motor 48 the joint circuit for said windings is thereupon interrupted to permit the several plungers to drop, and thereafter the next contact 50 engages contact 51 to again complete the joint circuit for the solenoid windings whereby another step in the rotary movement of the shafts 28 and the respective sets of cams carried thereby is effected.

The operation of the other elements of the system of Fig. 3 is otherwise identical with the described operation of the system of Fig. 1. Thus shafts 28 may be provided at the right-hand ends thereof with disks 31 (shown in greater detail in Fig. 2) which provide for manual rotary adjustment of the sets of cams, and the aforementioned legends upon said disks facilitate such adjustment. With the sets of cams 24 to 27 angularly adjusted as shown in Fig. 3, the motors 5, 6 and 7 will be reversed intermittently in the desired sequence and in a predetermined timed relationship to each other. It will be noted that by use of the ratchet devices of Fig. 3, the necessity for slip clutches, such as 32 of Fig. 1, is obviated.

While I have shown an electric motor 48 for effecting rotation of hub 49 with its associated contacts 50, it is to be understood that any other suitable motive power, such as a clock mechanism, a water driven motor or the like, might be employed.

Various modifications in the adjusting and indicating means herein disclosed will at once suggest themselves to those skilled in the art.

It is to be understood that a system like that of Fig. 3 is similarly applicable to the control of the maximum number of driving motors (eight) ordinarily combined in a group in the laundry industry.

While I have shown in Fig. 1, and prefer to use, a synchronous motor of the single-phase self-starting type, it is to be understood any other suitable form of synchronous motor may be employed.

What I claim as new and desire to secure by Letters Patent is:

1. In a reversing control system, in combination, a plurality, up to eight in number, of electric driving motors, a rotatable load individual to each motor, a reversing contol unit individual to each motor, each control unit comprising a set of rotatable cams for effecting periodic reversal of one of said motors, a shaft individual to each set of cams, power-operated driving means individual to each shaft, said driving means being operated at like speeds, and said shafts being initially arranged at predetermined rotary angles, to thereby insure against simultaneous reversing of any two or more of said driving motors.

2. In a reversing control system, in combination, a plurality, up to eight in number, of electric driving motors, a rotatable load individual to each motor, a reversing control unit individual to each motor, each control unit comprising a pair of electromagnetically operable reversing switches, a pair of switches for respectively controlling energization and de-energization of said reversing switches, a set of rotatable cams for controlling operation of each pair of switches last mentioned, a shaft individual to each set of cams, power-operated driving means individual to each shaft, each of said driving means comprising a pilot motor of the single-phase synchronous type, said pilot motors and said load driving motors being connected to a common source of alternating current, and a slip clutch interposed between each pilot motor and its associated cam shaft to permit initial manual adjustment of the rotary positions of said cam shafts relatively to each other, whereby the maximum value of the current inrushes incident to reversals of the load driving motors may be minimized.

3. In a reversing control system, in combination, a plurality, up to eight in number, of electric driving motors, a rotatable load individual to each motor, a reversing control unit individual to each motor, each control unit comprising a pair of electromagnetically operable reversing switches, a pair of switches for respectively controlling energization and de-energization of said reversing switches, a set of rotatable cams for controlling operation of each pair of switches last mentioned, a shaft individual to each set of cams, power-operated driving means individual to each shaft, each of said driving means comprising a pilot motor of the single-phase synchronous type, said pilot motors and said load driving motors being connected to a common source of alternating current, a slip clutch interposed between each pilot motor and its associated cam shaft to permit initial manual adjustment of the rotary positions of said cam shafts relatively to each other, whereby the maximum value of the current inrushes incident to reversals of the load driving motors may be minimized, each of said cam shafts having a disk rigidly attached thereto, a plurality of legends arranged in a like manner upon each disk, and a plurality of members arranged in fixed relation to the respective disks for cooperation with the legends upon the latter, to visually indicate the proper angular relationship of the respective cam shafts in accordance with the number of load driving motors to be rendered active.

4. In a control system for timing reversals of a plurality of electric motors to be supplied with energy from a common source, in combination, a pair of electromagnetically operable reversing switches for each of said motors, a pair of switches each individual to one of said reversing switches to control energization and de-energization of the latter, a pair of cams individual to each of the switches last mentioned for controlling opening and closing of the latter, a rotatable shaft common to said cams and to which the same are rigidly secured in a predetermined rotary relationship to each other, a plurality of power-operated driving means having like speeds, each driving means being individual to one of said shafts, and each of said shafts having means individual thereto to provide for initial rotary adjustment of the same relatively to each other to insure against simultaneous reversal of two or more of said motors at any one time.

5. In a control system for timing reversals of a plurality of electric motors to be supplied with energy from a common source, in combination, a pair of electromagnetically operable reversing switches for each of said motors, a pair of switches each individual to one of said reversing switches to control energization and de-energization of the latter, a pair of cams individual to each of the switches last mentioned for controlling opening and closing of the latter, a rotatable shaft common to said cams and to which the same are rigidly secured in a predetermined rotary relationship to each other, a plurality of power-operated driving means having like speeds, each driving means being individual to one of said shafts, each of said shafts having means individual thereto to provide for initial rotary adjustment of the same relatively to each other to insure against simultaneous reversal of two or more of said motors at any one time, said last mentioned means comprising manually operable disks rigidly secured to the respective shafts, each of said disks having a plurality of indicating legends positioned thereon in predetermined angular relationship to each other, and a fixed member associated with each disk for cooperation with the respective legends to facilitate such initial angular adjustment of said shafts.

6. In an electric motor control system, in combination, a plurality of reversible motors, a corresponding number of reversing control units individual to the respective motors, each of said units comprising a pair of electromagnetically operable reversing switches, means for effecting energization and closure of said switches alternately to provide for operation of said motor in forward and reverse directions for substantially equal periods of time, said means comprising a pair of switches, a set of cams for controlling said last mentioned switches, a rotatable shaft to which said cams are rigidly attached, power-operated driving means individual to the cam shaft of each control unit, all of said driving means being operated at like speeds, and the cam-shafts and cams of the units being angularly displaced with respect to each other, to thereby insure against overlap of the current in-rushes incident to reversing operation of the several motors.

7. In an electric motor control system, in combination, a plurality of reversible motors, a corresponding number of reversing control units individual to the respective motors, each of said units comprising a pair of electromagnetically operable reversing switches, means for effecting energization and closure of said switches alternately to provide for operation of said motor in forward and reverse directions for substantially equal periods of time, said means comprising a pair of switches, a set of cams for controlling said last mentioned switches, a rotatable shaft to which said cams are rigidly attached, power-operated driving means individual to the cam shaft of each control unit, manually operable means comprising disks rigidly attached to the respective cam shafts to provide for initial rotary adjustment thereof independently of said individual driving means, said disks each having a plurality of legends thereon, and a plurality of elements in fixed relation to the respective disks for cooperation with said legends to indicate the proper initial angular positions of said shafts in accordance with the number of control units to be rendered active.

8. In a control system of the character described, in combination, a plurality of reversible electric motors, a corresponding number of pairs of electromagnetically operable reversing switches, which pairs are respectively individual to said motors, a corresponding number of pairs of switches adapted to control energization and de-energization of said reversing switches, a plurality of sets of rotary cams individual to each of said last mentioned pairs of switches, the cams of each set being arranged to insure energization and de-energization of each reversing switch of each pair prior to energization and de-energization of the other of same, a plurality of rotary shafts to which the respective sets of cams are rigidly attached, power-operated means individual to each shaft for effecting like speeds of rotation thereof, and associated means to provide for initial rotary adjustment of said shafts relatively to each other, to thereby insure against simultaneous opening and/or closing of any two or more of said electromagnetically operable switches.

9. In a control system of the character described, in combination, a plurality of reversible electric motors, a corresponding number of pairs of electromagnetically operable reversing switches, which pairs are respectively individual to said motors, a corresponding number of pairs of switches adapted to control energization and de-energization of said reversing switches, a plurality of sets of rotary cams individual to each of said last mentioned pairs of switches, the cams of each set being arranged to insure energization and de-energization of each reversing switch of each pair prior to energization and de-energization of the other of same, a plurality of rotary shafts to which the respective sets of cams are rigidly attached, power-operated means individual to each shaft for effecting like speeds of rotation thereof, associated means to provide for initial rotary adjustment of said shafts relatively to each other, to thereby insure against simultaneous opening and/or closing of any two or more of said electromagnetically operable switches, said last mentioned means including manually operable disks rigidly secured in like angular relationship to the respective shafts, said disks having like groups of legends arranged thereon, and members arranged in fixed relationship to the respective disks and cooperating with the legends upon the latter to indicate when the proper initial angular positioning of the respective shafts has been effected.

10. In a control system of the character described, in combination, a plurality of pairs of electromagnetically operable reversing switches, a corresponding number of pairs of switches adapted to control energization and de-energization of said reversing switches, a plurality of sets of rotary cams individual to each of said last mentioned pairs of switches, the cams of each set being arranged to insure energization and de-energization of each switch of each pair prior to energization and de-energization of the other of same, a plurality of rotary shafts to which the respective sets of cams are rigidly attached, power-operated means individual to each shaft for effecting like speeds of rotation thereof, associated means to provide for initial rotary adjustment of said shafts relatively to each other, to thereby insure against simultaneous opening and/or closing of any two or more of said electromagnetically operable switches, a reversible electric motor to be controlled by each of said pairs of switches first mentioned, a rotary washing machine cylinder to be driven by each of said motors, the power-operated means for each shaft comprising a pilot motor of the single-phase synchronous type, and a common source of alternating current supply for said first mentioned motors and said pilot motors.

11. In a control system for timing the reversals of a plurality of electric motors to be supplied with energy from a common source, the combination with a plurality of cam shafts corresponding with the number of motors to be controlled, means for insuring unidirectional rotation of said shafts at like speeds, a manually operable disk rigidly attached to each shaft, indicating members arranged in fixed relation to the respective disks, and a like group of legends arranged on each disk, said legends cooperating with said indicating members to indicate when the desired angular positions of the cam shafts associated with the respective active motors have been attained.

12. In a control system for a group, up to eight in number, of reversible electric motors for respectively driving the rotatable cylinders of washing machines or the like, the combination with a common source of alternating current for said motors, a pair of electromagnetically operable reversing switches for each motor, a pair of cam operated switches individual to each pair of switches aforementioned for respectively controlling energization and de-energization thereof, a set of cams individual to each pair of switches last mentioned, rotatable shafts to which said sets of cams are rigidly attached, a toothed wheel rigidly attached to each shaft, a pawl associated with each wheel, an operating winding for each pawl, means for connecting said windings in parallel circuit relation, means for intermittently completing and interrupting the energizing circuit for said windings jointly, said means comprising a stationary contact and a plurality of movable contacts to be sequentially engaged with and disengaged from said stationary contact, and a single power-operated means for effecting such engaging and disengaging movements of said movable contacts.

13. In a control system for a group, up to eight in number, of reversible electric motors for respectively driving the rotatable cylinders of washing machines or the like, the combination with a common source of alternating current for said motors, a pair of electromagnetically operable reversing switches for each motor, a pair of cam operated switches individual to each pair of switches aforementioned for respectively controlling energization and de-energization thereof, a set of cams individual to each pair of switches last mentioned, rotatable shafts to which said sets of cams are rigidly attached, a toothed wheel rigidly attached to each shaft, a pawl associated with each wheel, an operating winding for each pawl, means for connecting said windings in parallel circuit relation, means for intermittently completing and interrupting the energizing circuit for said windings jointly, said means comprising a stationary contact and a plurality of movable contacts to be sequentially engaged with and disengaged from said stationary contact, a single power-operated means for effecting such engaging and disengaging movements of said movable contacts, a manually operable disk rigidly attached to each shaft, said disks having like legends arranged thereon in a predetermined relationship to the cams associated therewith, and a fixed member associated with each disk to facilitate initial angular adjustment of said shafts relatively to each other, for the purpose set forth.

14. In a control system for a group, up to eight in number, of reversible electric motors for respectively driving the rotatable cylinders of washing machines or the like, the combination with a common source of alternating current for said motors, a pair of electromagnetically operable reversing switches for each motor, a pair of cam operated switches individual to each pair of switches aforementioned for respectively controlling energization and de-energization thereof, a set of cams individual to each pair of switches last mentioned, rotatable shafts to which said sets of cams are rigidly attached, a toothed wheel rigidly attached to each shaft, a pawl associated with each wheel, an operating winding for each pawl, means for connecting said windings in parallel circuit relation, means for intermittently completing and interrupting the energizing circuit for said windings jointly, said means comprising a stationary contact and a plurality of movable contacts to be sequentially engaged with and disengaged from said stationary contact, a single power-operated means for effecting such engaging and disengaging movements of said movable contacts, a disk rgidly attached to each shaft, said disks having like legends arranged thereon in a predetermined relationship to the cams associated therewith, and a fixed member associated with each disk to facilitate initial angular adjustment of said shafts relatively to each other, for the purpose set forth, said pawls cooperating with said toothed wheels to permit unidirectional manual adjustment of said shafts independently of said power-operated means.

15. In a control system of the character described, in combination, a plurality of rotatable loads, a plurality of reversible electric motors for individually driving the respective loads, a control unit for each of said motors comprising a pair of electromagnetically operable switches respectively adapted when closed to provide for operation of the respective motor in opposite directions, mechanical interlocking means to insure against closure of said switches simultaneously, an operating winding for each of said switches, a pair of switches each of which is adapted to control energization and de-energization of one of said windings, two pairs of rotatable cam members, each pair being adapted to control opening and closing of one of said last mentioned switches, each unit also including a rotatable shaft individual thereto to which all of said cams are rigidly attached in a predetermined rotary relationship to each other, power-operated means for effecting unidirectional rotation of the respective shafts, means for insuring a predetermined relative rate of operation of said last mentioned means, and manually operable means for effecting a predetermined initial rotary adjustment of each shaft and the cams carried thereby, whereby each of said control units may be synchronized independently of said first mentioned motors in a definite relationship to one or more of the other control units of like character, for the purpose set forth.

16. In a control system of the character described, in combination, a plurality of rotatable loads, a plurality of reversible electric motors for individually driving the respective loads, a control unit for each of said motors comprising a pair of electromagnetically operable switches respectively adapted when closed to provide for operation of the respective motor in opposite directions, mechanical interlocking means to insure against closure of said switches simultaneously, an operating winding for each of said switches, a pair of switches each of which is adapted to control energization and de-energization of one of said windings, two pairs of rotatable cam members, each pair being adapted to control opening and closing of one of said last mentioned switches, each unit also including a rotatable shaft individual thereto to which all of said cams are rigidly attached in a predetermined rotary relationship to each other, power-operated means for effecting unidirectional rotation of the respective shafts, means for insuring a predetermined relative rate of operation of said last mentioned means, manually operable means for effecting a predetermined initial rotary adjustment of each shaft and the cams carried thereby, whereby each of said control units may be synchronized independently of said first mentioned motors in a definite relationship to one or more of the other control units of like character, for the purpose set forth, said last mentioned means comprising a manually operable disk rigidly attached to each shaft to provide for rotation of the latter independently of said power-operated means, an indicating element arranged in a fixed position for cooperation with the respective disk, and each disk having a plurality of legends thereon to indicate the proper initial rotary position of each shaft with respect to the shafts of the other control units of like character.

17. In a system comprising unit controllers for the electric driving motors of washing machines or the like, in combination, a plurality of reversible electric motors to be supplied with energy from a common alternating current source, a corresponding number of pairs of electromagnetically operable reversing switches for the respective motors, means individual to each unit comprising: a pair of switches for controlling energization and de-energization of the respective pair of reversing switches, means comprising a plurality of rotatable cams for controlling operation of said last mentioned pair of switches whereby one of the latter is closed and re-opened prior to closure and re-opening of the other, a plurality of shafts to which said sets of cams are rigidly secured for rotation thereby, means for driving said shafts, said means comprising a single-phase synchronous motor individual to each shaft to be connected with said alternating current source, and switching means to provide for completion of circuits for the last mentioned motors individually at will independently of said first mentioned motors, whereby said sets of cams may be initially moved to given angular positions relatively to each other, for the purpose set forth.

18. In a system comprising unit controllers for the electric driving motors of washing machines or the like, in combination, a plurality of reversible electric motors to be supplied with energy from a common alternating current source, a corresponding number of pairs of electromagnetically operable reversing switches for the respective motors, means individual to each unit comprising: a pair of switches for controlling energization and de-energization of the respective pair of reversing switches, means comprising a plurality of rotatable cams for controlling operation of said last mentioned pair of switches whereby one of the latter is closed and re-opened prior to closure and re-opening of the other, a plurality of shafts to which said sets of cams are rigidly secured for rotation thereby, means for driving said shafts, said means comprising a single-phase synchronous motor individual to each shaft to be connected with said alternating current source, switching means to provide for completion of circuits for said last mentioned motors individually at will independently of said first mentioned motors, whereby said sets of cams may be initially moved to given angular positions relatively to each other, for the purpose set forth, a disk rigidly attached to each of said shafts for rotation thereby, a plurality of legends upon each disk, and a fixed member cooperating with the legends on the respective disks to facilitate determination of the desired and/or proper rotary positions of said sets of cams.

RALPH G. LOCKETT.